United States Patent [19]
Kessel et al.

[11] Patent Number: 5,733,608
[45] Date of Patent: *Mar. 31, 1998

[54] METHOD AND APPARATUS FOR APPLYING THIN FLUID COATING STRIPES

[75] Inventors: Carl R. Kessel, St. Paul, Minn.; William K. Leonard, Troy Township, Wis.

[73] Assignee: Minnesota Mining and Manufacturing Company, St. Paul, Minn.

[*] Notice: The term of this patent shall not extend beyond the expiration date of Pat. No. 5,505,995.

[21] Appl. No.: 585,263

[22] Filed: Jan. 11, 1996

Related U.S. Application Data

[63] Continuation of Ser. No. 382,623, Feb. 2, 1995, abandoned.

[51] Int. Cl.[6] .............................. B05D 1/26; B05D 1/30; B05C 5/00; B05C 5/02
[52] U.S. Cl. ............... 427/547; 427/331; 427/348; 427/350; 427/355; 427/356; 427/402; 427/420; 427/428; 118/63; 118/123; 118/126; 118/410; 118/411; 118/324; 118/DIG. 4
[58] Field of Search .................. 427/348, 350, 427/356, 402, 420, 547, 331, 355, 428; 118/63, 324, 410, 411, DIG. 4, 244, 249, 123, 126

[56] References Cited

U.S. PATENT DOCUMENTS

| | | |
|---|---|---|
| Re. 24,906 | 12/1960 | Ulrich . |
| 2,135,406 | 11/1938 | MacDonald . |
| 2,139,628 | 12/1938 | Terry . |
| 2,761,419 | 9/1956 | Mercier et al. . |
| 2,761,791 | 9/1956 | Russell . |
| 3,005,440 | 10/1961 | Padday . |
| 3,508,947 | 4/1970 | Hughes . |
| 3,632,378 | 1/1972 | Busch . |
| 3,632,403 | 1/1972 | Greiller . |
| 3,886,898 | 6/1975 | Colegrove et al. . |
| 3,916,077 | 10/1975 | Damrau . |
| 3,920,862 | 11/1975 | Damschroder et al. . |
| 4,093,757 | 6/1978 | Barrand et al. . |
| 4,295,440 | 10/1981 | Nakai et al. . |
| 4,348,432 | 9/1982 | Huang . |
| 4,472,480 | 9/1984 | Olson . |
| 4,476,165 | 10/1984 | McIntyre . |
| 4,504,645 | 3/1985 | Melancon . |
| 4,521,457 | 6/1985 | Russell et al. . |
| 4,675,208 | 6/1987 | Kageyama et al. ........ 118/411 |
| 4,748,043 | 5/1988 | Seaver et al. . |
| 4,978,731 | 12/1990 | Mclancon et al. . |
| 5,234,500 | 8/1993 | Korokeyi . |
| 5,318,804 | 6/1994 | Yoshida .................... 427/356 |
| 5,332,797 | 7/1994 | Kessel et al. . |
| 5,389,150 | 2/1995 | Baum et al. ............. 118/DIG. 4 |
| 5,505,995 | 4/1996 | Leonard .................... 427/420 |

FOREIGN PATENT DOCUMENTS

| | | |
|---|---|---|
| 0 056 704 | 7/1982 | European Pat. Off. . |
| 0 562 975 A2 | 9/1993 | European Pat. Off. . |
| 1 220 295 | 6/1966 | Germany . |
| 2-173080 | 7/1990 | Japan . |
| 2-207870 | 8/1990 | Japan . |
| WO 92/11095 | 7/1992 | WIPO . |

*Primary Examiner*—Katherine A. Bareford
*Attorney, Agent, or Firm*—Charles D. Levine

[57] ABSTRACT

A system for coating a substrate with ultra-thin layers in stripes includes moving the substrate through a coating station and forming a composite layer including coating fluids and a carrier fluid. The composite layer flows at a rate that is sufficiently high to form a continuous flowing fluid bridge of composite layer to the substrate surface and to contact the substrate with the flowing composite layer to interpose the coating layers between the substrate and the carrier fluid. The carrier fluid is removed while leaving the coating fluid deposited on the substrate as a coating layer.

30 Claims, 9 Drawing Sheets

METHOD AND APPARATUS FOR APPLYING THIN FLUID COATING STRIPES

This is a continuation of application Ser. No. 08/382,623 filed Feb. 2, 1995, now abandoned.

TECHNICAL FIELD

The present invention relates to coating. More particularly, the present invention relates to preparing and applying ultra-thin coating stripes.

BACKGROUND OF THE INVENTION

Coating is the process of replacing the gas contacting a substrate, usually a solid surface such as a web, by a layer of fluid. Sometimes, multiple layers of a coating are applied on top of each other. After the deposition of a coating, it can remain a fluid such as in the application of lubricating oil to metal in metal coil processing or the application of chemical reactants to activate or chemically transform a substrate surface. Alternatively, the coating can be dried if it contains a volatile fluid to leave behind a solid coat such as a paint, or can be cured or in some other way solidified to a functional coating such as a release coating to which a pressure sensitive adhesive will not aggressively stick. Methods of applying coating are discussed in Cohen, E. D. and Gutoff, E. B., *Modern Coating and Drying Technology*, VCH Publishers, New York 1992 and Satas, D., *Web Processing and Converting Technology and Equipment*, Van Vorstrand Reinhold Publishing Co., New York 1984. It is desired and necessary in many situations to coat ultra-thin layers which are layers no more than 5 microns thick.

Numerous products are made from webs coated with stripes of two or more different formulations coated downweb side-by-side. This technology is useful in manufacturing differential release coatings and in other products. The different formulations may differ in color through the addition of a dye or pigment, or they may differ in chemical formulation to have different chemical, physical, or surface properties.

Of the coating methods known for applying continuous fluid coatings (such as roll, curtain, slot, air knife, slide, and gravure coating) other than water expansion techniques, none can apply wet coating thicknesses below about 0.1 micron. To achieve lower final dry thicknesses with these methods, the coating must be diluted with a solvent that can be removed by evaporation to leave behind the desired coating below about 0.1 micron. This increases costs by adding the cost of the diluent and the cost of preparing the diluted coating fluid. Also, the necessary solvent is often hazardous to the environment and the manufacturing personnel.

Discontinuous methods of applying ultra-thin coatings molecule by molecule or drop by drop include condensing from a vapor phase and the electrospray process described in U.S. Pat. No. 4,748,043. However, few fluid coatings of commercial interest can be successfully vaporized, and the electrospray process is limited to a narrow range of viscosity and electrical properties of the coating fluid.

For thicknesses greater than 0.1 micron, multiple roll or transfer roll coaters are used. Typical commercial equipment includes the five roll coater sold by the Bachofen & Meier AG, of Bulach, Germany, and others. This coater style is expensive to purchase and maintain because of its many driven rolls. Any defect in the surface of the rolls usually produces a repeating defect in the coating. Additionally, these coaters have not successfully applied wet coatings in the 0.005 to 0.1 micron range.

Water expansion techniques first started with the Langmuir-Blodgett method of producing and depositing monomolecular films as described by Blodgett in the *Journal of the American Chemical Society* (Vol. 57, 1007, 1935). This method involves casting a dilute solvent solution of a film-forming organic molecule on a stagnant water surface. The solution spreads to form a thin film on the water-air interface. The solvent is evaporated leaving behind a monolayer of film forming molecules. The film is then deposited on the surface of a substrate bypassing the substrate through the water surface on which the monomolecular layer film is riding. U.S. Pat. No. 4,093,757 discloses forming a continuous monomolecular deposit on a continuous substrate. Japanese Patent Application 63-327260 discloses an improvement of the Langmuir-Blodgett monomolecular technology where films greater than a monomolecular layer thick are deposited on a continuous substrate to form an ultra-thin film coating at thicknesses of 0.005 to 5 microns.

Although the water surface expansion technique can coat useful coatings on substrates, it requires that the coating fluid spontaneously and rapidly spread on the water-air interface. To achieve this for many coating formulations, additional solvents or surface active agents must be found and added. Additionally, the maximum coating rate is limited by the rate of spreading. Also, the speed of coating the substrate is limited by other problems. It is reported that at modest speeds of 10 to 50 m/minute, air bubbles tend to be trapped between the film and the substrate. Water expansion techniques rely on picking the coating from a stagnant water pond by passing the substrate through the water surface or contacting the substrate to the water surface. Often, evaporation of solvent must occur to create a solid or near solid surface film to allow the direct transfer of the coating to the substrate. The surface of the pond is also subject to contamination that can increase with time, degrading the coating quality. The water expansion technique is not known to be useable with miscible coating fluids and water soluble or dispersible coating constituents.

To use these known techniques to apply abutted side-by-side downweb stripes requires multiple processing steps. For example, multiroll transfer coaters would require two coating stations, one for each formulation. In addition, extremely precise tracking of the web and alignment of the coater is necessary to produce the abutting side-by-side stripes without overlap or gaps between the stripes.

There is no known method of using water expansion techniques to apply abutting and different down web stripes simultaneously. One would expect that if different formulations with different water surface spreading characteristics were placed on the surface of water, the material with the highest spreading coefficient or the formulation with the highest rate of spreading would dominate the water surface making it impossible to form the discrete controlled regions necessary to produce stripes. Also, if two liquids of different surface tensions are placed in side-by-side contact, the forces created by the unbalanced surface tensions should cause the mating line at every point to move perpendicular to the interface at that point and toward the high surface tension fluid. Again, such behavior would be expected to make it impossible to deposit fluid of different formulations as uniform, constant width, abutting stripes on a liquid or substrate. With the known technology, the only procedure for creating abutting stripes using water expansion is by first masking the substrate area to which material B is to be applied, then coating material A, then stripping the first masking off the web, then solidifying material A, then masking the A coated surface, then coating and solidifying material B, and then removing the second masking. Such a procedure requires multiple coating stations, and is complex. Manufacturing product by this procedure is costly.

SUMMARY OF THE INVENTION

This invention is an apparatus and method which coat a plurality of simultaneously applied, abutting stripes of differing coating formulations onto substrates. The substrate is moved along a path through the coating station. A plurality of separate flowing layers of coating fluids is formed and flowed into side-by-side abutting contact to form a single flowing layer of side-by-side stripes of different formulations. A flowing layer of a carrier fluid is formed and the plurality of coating fluids is flowed in contact with the carrier fluid to form a composite layer. The composite layer flows at a rate that is sufficiently high to form a continuous flowing fluid bridge of composite layer to the substrate surface for the coating width. The flowing composite layer contacts the substrate to interpose the coating layer between the substrate and the carrier fluid. The carrier fluid is removed while leaving the coating fluid on the substrate as a coating layer.

The substrate passes through the coating station at speeds ranging up to 2000 m/minute. The forming step can use a slide coater, a curtain coater, an extrusion coater, a slot coater, a knife coater, a jet coater, a roll coater, or other coaters, many of which are described in Cohen and Gutoff. The carrier fluid can be removed by doctoring, suction, draining by gravity, blowing, centrifugal removal, evaporation, using electric or magnetic fields, solidification or gelling of coating or carrier followed by mechanical removal, absorption combining any of these methods. Additionally, the composite layer can be deposited on a transfer surface, such as a roll or a belt, before contacting the substrate. The carrier fluid can be removed from the transfer surface and so that only the coating fluid is transferred to the substrate from the transfer surface.

The substrate may be a continuous web running at speeds of 1 to 2000 m/minute through the coating station or it may be discrete sheets or parts transported through the coating station.

DETAILED DESCRIPTION

In this invention, a flowing composite layer fluid stream of carrier fluid and coating fluid is created and deposited on the surface of a substrate, such as a web. Deposition occurs as the web moves through the coating station such that the fluid composite layer first contacts the web surface to form a composite layer with carrier fluid at the air interface on the web and coating fluid between the web and the carrier fluid. The carrier fluid is removed to leave an ultra-thin coating fluid layer.

The substrate can be any substrate such as a continuous web, discrete sheets or rigid piece parts, or an array of pieces or parts transported through the coating station. The coating fluid can be coated at mean thicknesses that are ultra-thin ranging from 0.005 to 5 microns. Additionally, fluids can be coated onto substrates at thicknesses greater than the ultra-thin range including 100 microns or more.

Figure 1:
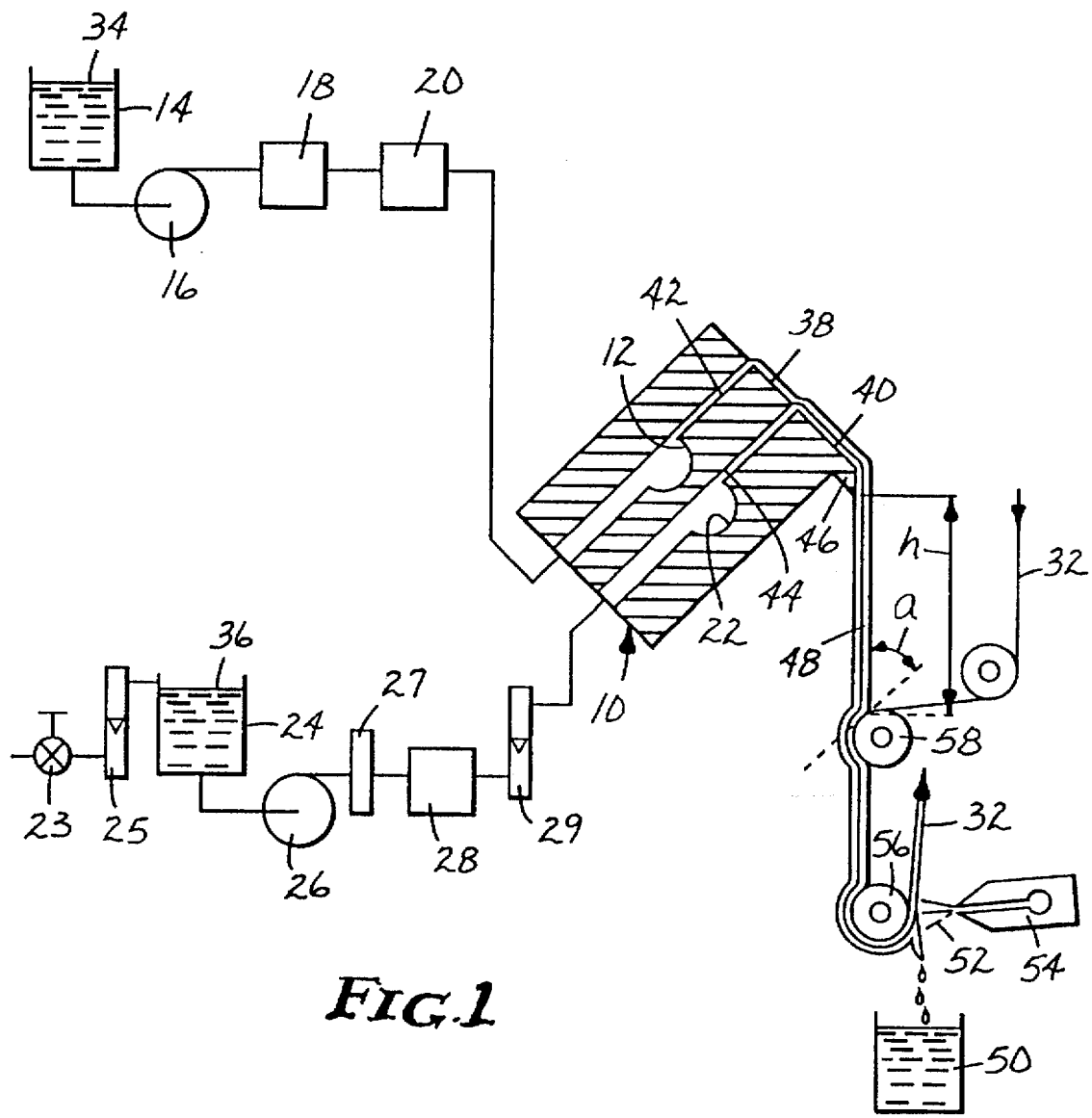
FIG. 1 is a schematic view of a slide curtain coating apparatus according to the present invention.

FIG. 1 shows a coating station having an apparatus for coating at speeds of 1 to 2000 m/minute. A coating die 10, shown as a photographic slide curtain coater, has an internal cavity 12. The internal cavity 12 is connected to a tank 14 by a precision metering pump 16 through a filter 18 and a bubble trap 20. The die 10 also has an internal cavity 22 which is connected to a tank 24 by a precision metering pump 26 through a surge tank 27, a filter 28 and a flow meter 29. A coating station is located next to the die 10. A continuous web 32 passes through the coating station and past the die 10 which is mounted transverse to the web.

Coating fluid 34 is pumped at a precisely controlled rate from the tank 14 by the precision metering pump 16 through the filter 18 and the bubble trap 20 into the internal cavity 12 of the coating die 10. Carrier fluid 36 is pumped at a controlled rate from the tank 24 by the precision metering pump 26 through the surge tank 27, the filter 28, and the flow meter 29 into the internal cavity 22 of the coating die 10. Carrier fluid is continuously added to the vacuum tank 24 through a flow control valve 23 and flow meter 25 from a source (not shown). Tank 24 is connected to a vacuum source which is not shown. For ultra-thin coatings, the flow rate of the carrier fluid is much greater than that of the coating fluid.

The internal cavities 12 and 22 distribute the coating fluid 34 and carrier fluid 36 across the width of the die 10 and to the die faces 38, 40 by distribution slots 42, 44. The composite layer is formed by continuously metering the respective fluids through respective orifices of the slots. The coating fluid 34 flows onto the top of the carrier fluid 36 at the exit of the slot 44, and then flows on top of the carrier fluid, in face-to-face contact, down the inclined die face 40 to the die lip 46. From the lip 46, the composite layer film falls in a curtain 48 under the influence of gravity to contact the web 32. The web 32 is moved through the coating station and past the die 10 so that when the multiple layer curtain 48 contacts the web 32 the coating fluid is adjacent the web surface and is interposed between the web and the carrier fluid. The coating fluid 34 contacts the web. The carrier fluid 36 does not. At the point of contact, a composite layer of coating fluid and carrier fluid has been applied to the web.

The composite layer flows at a rate that is sufficiently high to form a flowing, uninterrupted fluid bridge of composite layer from the die lip 46 to the web surface for the coating width. The rate of the coating fluid alone need not sufficient to form a continuous flowing fluid bridge. Regardless of whether the coating fluid is continuous, the carrier fluid must be continuous. The fluid bridge has two distinct fluid-gas interfaces: the coating fluid-air interface and the carrier fluid-air interface. Gases other than air can be used as long as they do not interfere with the coating process.

The carrier fluid is a distinct composition that differs from the coating fluid. The carrier fluid functions to form a bridge between the die and the web upon which the coating fluid can travel to transport the coating fluid to the web and to facilitate the creation of a thin layer of coating fluid before the coating fluid contacts the web. It can contain components that diffuse into the coating fluid or solid materials that by some mechanism are left on the coating fluid after the carrier fluid has been removed from the web. The carrier fluid can be tap water or other fluids. The properties of the coating fluid and the carrier fluid cause the coating fluid flowing onto the carrier fluid to form a continuous surface film, where desired, before reaching the web. After the carrier fluid transports the coating fluid to the web and after the composite layer is deposited on the web, the carrier fluid is removed. All of the carrier fluid need not be removed as long as what remains does not impair the desired characteristics of the coated web.

To achieve good coating uniformity on the web, the carrier fluid flow rate, the curtain height "h", and the curtain angle of impingement "a" with the web are selected and adjusted as the web speed is changed. The curtain height "h" is the distance between the die lip 46 and the web 32 along the path of the carrier fluid curtain 48. This path need not be vertical. Under the influence of surface tension forces, electrostatic forces, viscous traction forces, or magnetic forces, the path can be curved or at an angle near horizontal, especially when the gap from the die to the web is small. At very low speeds, it is often necessary to use a small curtain height (less than 1 cm), an impingement angle near zero, and a minimum carrier flow rate to maintain a continuous, disturbance-free curtain 48 between the lip 46 and the web 32. The curtain 48 must contact the web so that the coating fluid assumes the web velocity, and the coating fluid is acquired by and carried along with the web. Excessively large carrier flow rates, impingement angles, or impingement velocities can cause instability of the fluid bridge when it contacts the web. This can disrupt the coating, or entrain or emulsify the coating fluid in the carrier fluid.

The removal of all or a portion of the carrier fluid from the web 32 without objectionable removal of the coating fluid is possible if at least one of the following physical and chemical property conditions are met: (a) the carrier fluid is substantially more volatile than the coating fluid and can be evaporated leaving behind the coating; (b) the carrier fluid has a substantially lower viscosity than the coating fluid; (c) the carrier fluid does not wet the coating fluid-covered web; (d) the coating fluid preferentially reacts with or is absorbed by the substrate; (e) either coating or carrier are gelled or solidified at the coating station; and (f) the carrier fluid can be absorbed and removed by contacting with an absorbing medium. If the carrier fluid is (g) not miscible with the coating fluid, removal of the carrier fluid is often easier.

A number of alternative mechanical methods of removal of at least some portion of the carrier fluid are possible. If conditions (b), (c), or (d) are met, at low web speeds most of the carrier fluid can be drained under the influence of gravity into a receptacle 50 while the coating fluid remains on and is carried away with the web. Gravity drainage is especially effective at low speeds if conditions (b), (c), and (g) are met. At higher speeds, a gas doctor nozzle, such as an air doctor nozzle 54 as shown in FIG. 1, can supplement gravity drainage. A jet of gas 52 issues from the nozzle 54 creating pressure and shear to force the carrier fluid off the web. At high speeds, the carrier fluid can also be thrown off by centrifugal force when the web rapidly changes direction when turning around a small diameter roll.

Surprisingly, when the coating fluid on the web is less than 10 microns thick, and condition (b) is met, mechanical doctors (not shown) can remove the majority of the carrier fluid leaving the majority, often all, of the coating fluid on the web.

In one example, the coating fluid is deposited as a layer at least 100 times thinner than the carrier fluid; the coating layer has a viscosity ten times higher than the carrier layer; the coating fluid has a vapor pressure less than half that of the carrier layer; the coating layer has interfacial properties such that it does not de-wet from the web while traveling through the coating station; the carrier fluid has interfacial properties such that it does de-wet from the coating fluid-wet web; and the interfacial tension between the carrier fluid and the coating fluid is greater than 1 dyne/cm.

Another unexpected feature of this invention is that if the carrier and coating fluids are immiscible and the viscosity of the coating fluid is higher than that of the carrier fluid, the flow of the carrier fluid can be allowed to become turbulent. Previously, it has always been taught that for the simultaneous unmixed application of multiple fluid layers to a web, both layers must be kept in laminar flow in their respective slots 42 and 44, and in flow down the die face 40. The flow down an incline is transitional if the Reynolds Number, Re, is greater than 1000 and is laminar if the number is less than 1000. For flow down an incline of a Newtonian, non-shear thinning fluid, the Reynolds Number is given by Re=4 G/m where G is the mass flow rate per unit width of incline and m is the viscosity of the fluid. For flow in a slot, the Reynolds Number should be kept below 1400 to remain laminar. For slots 42, 44, the Reynolds Number is calculated from the equation Re=G/m. Still another unexpected feature is that thin coatings may be obtained of miscible coating and carrier fluids. In this case, the mechanical removal of at least some portion of the carrier fluid is produced by drainage or by blowing it off with the gas doctor nozzle 54.

The coating fluid 34 is metered at a controlled volumetric flow rate to the die 10 by the metering pump 16. The mean thickness of the wet coating on the web 32 will approximately equal the volume of coating fluid delivered per unit time divided by the surface area of web upon which it is spread. When coating a continuous web, this area will equal the coated width of the web multiplied by the web speed. This enables easy adjustment of the applied coating deposition rate. It can be changed proportionally by changing the coating pumping rate or inversely proportionally by changing the web speed. If the web speed varies with time, the coating deposited can be kept constant by varying the coating flow rate in proportion to the web speed.

FIG. 2 shows an alternative coating die useful for coating at varying speeds and preferably above 200 m/min. The die 60 is a multiple layer jet coater. The die 60 ejects a free flowing jet of fluid 62 from the die slot 64, which receives carrier fluid 36 from the cavity 66. The coating fluid 34 issues from a cavity 68 and a slot 70, and slides along inclined die face 72 until it resides on the jet of carrier fluid 36 emanating from the slot 64. The composite jet 62 of two layers is formed at the exit of the slot 64.

A jet coater creates a free flowing jet of fluid 62 that issues from the die slot 64 at a sufficiently high velocity to form the jet 62 without the aid of gravity. In contrast, curtain coaters use gravity to allow the curtain 48 to break free from the coating die lip 46. With a Jet coater, the fluid carrier bridge or jet 62 can be created horizontally or vertically upward. Jet coaters have been used in the coating industry to apply only single layers and more commonly to apply a flooding of coating to a web before metering by a roll gap or a blade of a blade coater as is shown in the "Black Clawson Converting Machinery and Systems" brochure #23-CM, p. 4, by the Black Clawson Company of New York, N.Y. Jet coaters have not been used for simultaneous multiple layer application of fluids to produce multiple layers of fluid on a web.

Figure 2:
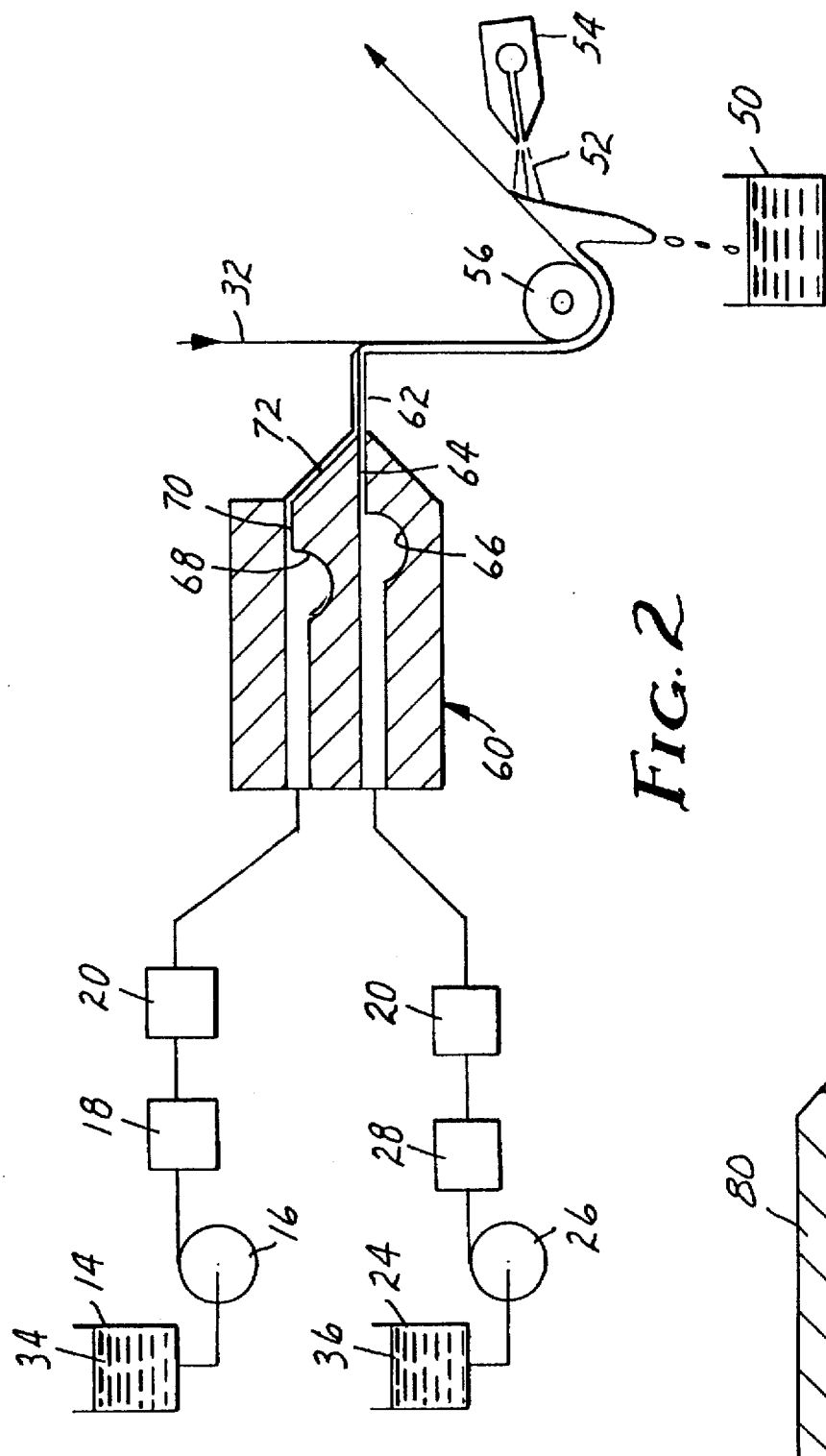
FIG. 2 is a schematic view of a jet coating apparatus according to another embodiment of the present invention.
Figure 3:
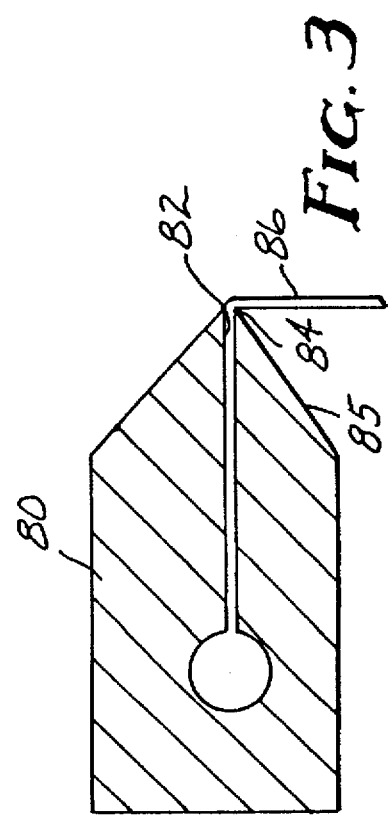
FIG. 3 is a schematic view of a known slot die coating apparatus.

Jet coaters, described in copending U.S. patent application Ser. No. 08/382,963, now U.S. Pat. No. 5,525,376, entitled "Multiple Layer Coating Method," are distinguished from slot or extrusion coaters in the following ways. First, in jet coaters, the gap between the coater lips and the web is usually greater than ten times the thickness of the fluid layer applied to the web. The second difference is illustrated by comparing the die 60 of FIG. 2 with the die 80 of FIG. 3. FIG. 3 shows how fluid flows from a slot die when not in close proximity to the web. The slot die 80 has an internal geometry and lip geometry that can be used for slot or extrusion coating. It is usually positioned so that the die slot 82 is horizontal. Thus, the coating fluid 86 issuing from the die slot 82 will flow vertically from the die lip 84 as shown if the web is far away from the die. Sometimes, the fluid will run down the face 85 before breaking free from the die body. With a jet coater the fluid will jet from the die lips with a velocity great enough to form a fluid sheet with a top and bottom free surface immediately upon exiting the die slot. A distinguishing feature of the jet coating method is that it can apply fluid to a web at some modest distance from the die lips relative to the thickness of the fluid jet sheet thickness. Importantly the flow is great enough to break free from the die lips unaided by any other forces (such as gravity, magnetic, and electrostatic) and form a free sheet that moves for a measurable distance horizontally away from the lips.

To apply ultra-thin coatings with a jet coater, a coating fluid is metered to the die 60 and flows from the slot 70 down the die face 72 and onto the carrier fluid 36 jetting from the slot 64 to form a composite layer free jet 62. The jet forms a fluid bridge between the die and the web. The angle of impingement of the jet 62 with the web 32, the carrier fluid flow rate, and the web speed are adjusted such that the coating fluid first contacts the web 32 and is carried along with the web without entraining a detrimental amount of air between the coating fluid and the web and without mixing the coating fluid with the carrier fluid.

Figure 4:
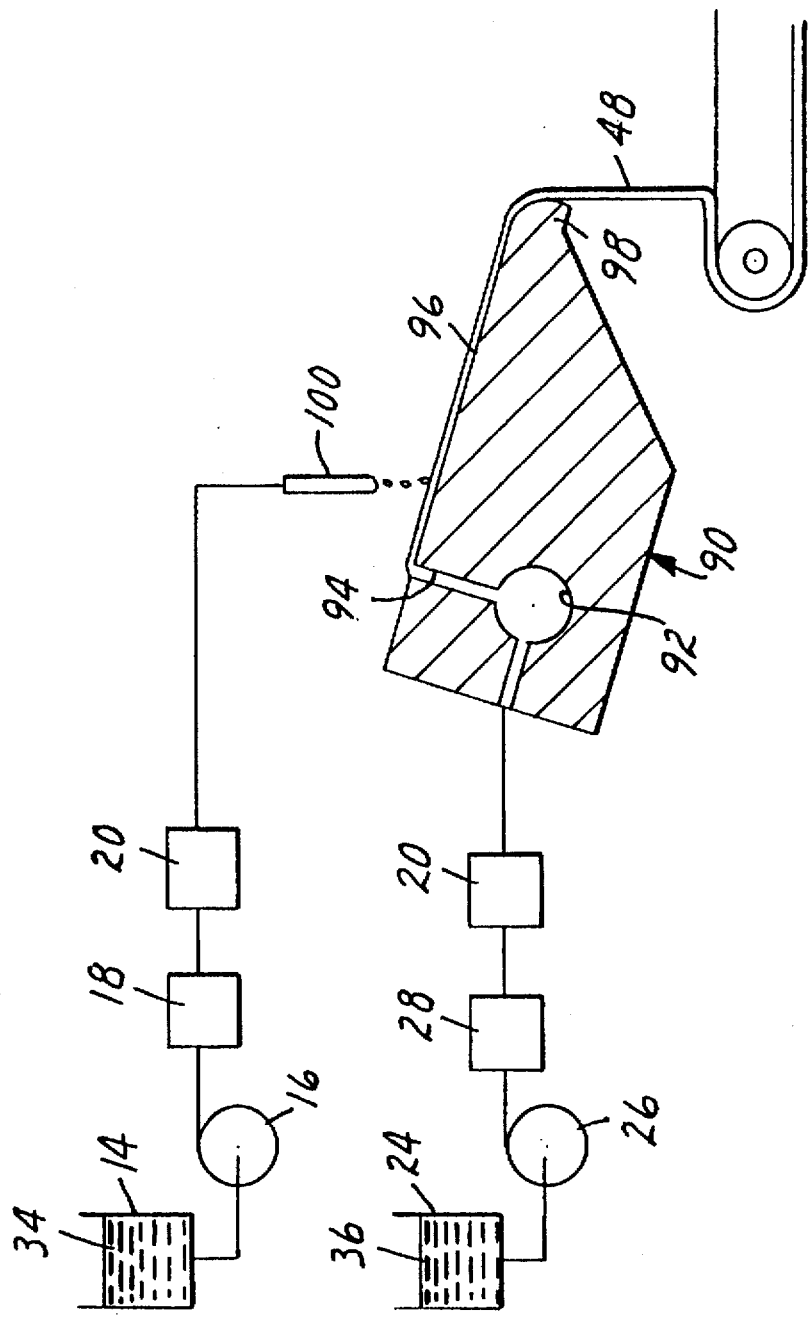
FIG. 4 is a schematic view of a simplified curtain coating apparatus according to another embodiment of the present invention.

If an ultra-thin coating is performed of a coating fluid that spontaneously and rapidly spreads on the free surface of a carrier fluid, the apparatus shown in FIG. 4 can be used. With this apparatus, a flat expanse of flowing carrier fluid is created by pumping carrier fluid 36 to the die cavity 92 of a die 90, through the die slot 94, and onto the die face 96. The die face 96 and lip 98 are designed to cause the carrier fluid 36 to flow under the influence of gravity to the die lip 98 from which it falls as a bridging curtain 48 onto the web 32. The coating fluid 34 is deposited drop by drop or as a continuous stream onto the carrier fluid 36 surface by a nozzle 100. The rate of flow of the carrier fluid and the time of travel to the lip from which the carrier bridges to the moving web surface must be sufficient to achieve the desired coverage.

Figure 5:
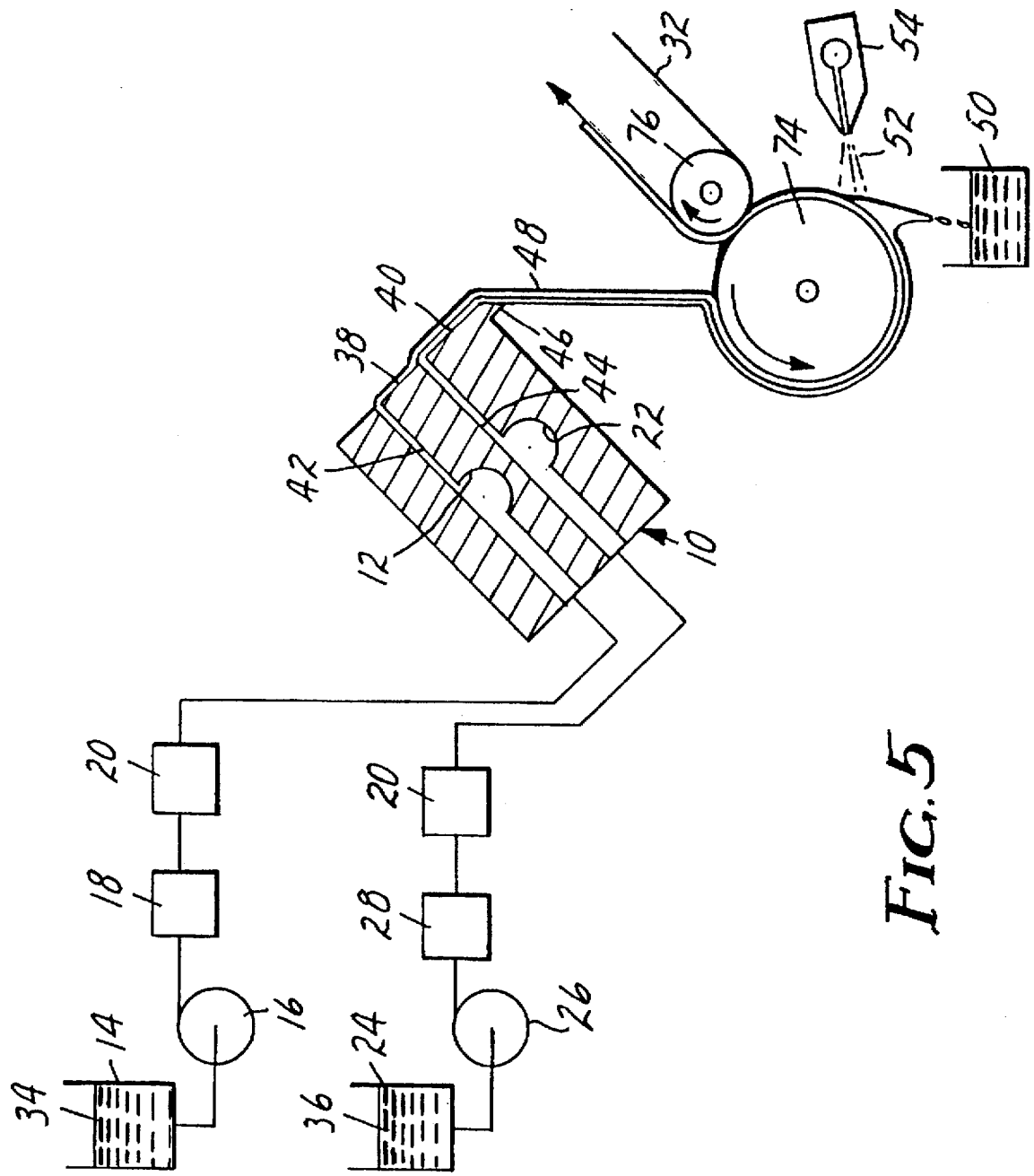
FIG. 5 is a schematic view of another embodiment of the present invention using a transfer roll where the carrier fluid is removed before the transfer of the coating fluid to the web.

Many different devices can be used to form the composite layer. A slide coating apparatus, a curtain coating apparatus, an extrusion coating apparatus, a slot coating apparatus, a jet coating apparatus, or a roll coating apparatus can be used. Additionally, the composite layer can be deposited on a transfer surface, such as a roll or a belt, before contacting the web, as shown in FIG. 5. The carrier fluid 36 is removed from the transfer roll 74 and the coating fluid is transferred to the web 32 from the transfer roll. This is accomplished by supporting the web 32 on the roller 76 which forms a nip with the transfer roll 74. Some portion of the coating can remain on the roll 74 surface after transfer to the web at the nip between the rolls 76, 74.

Figure 6:
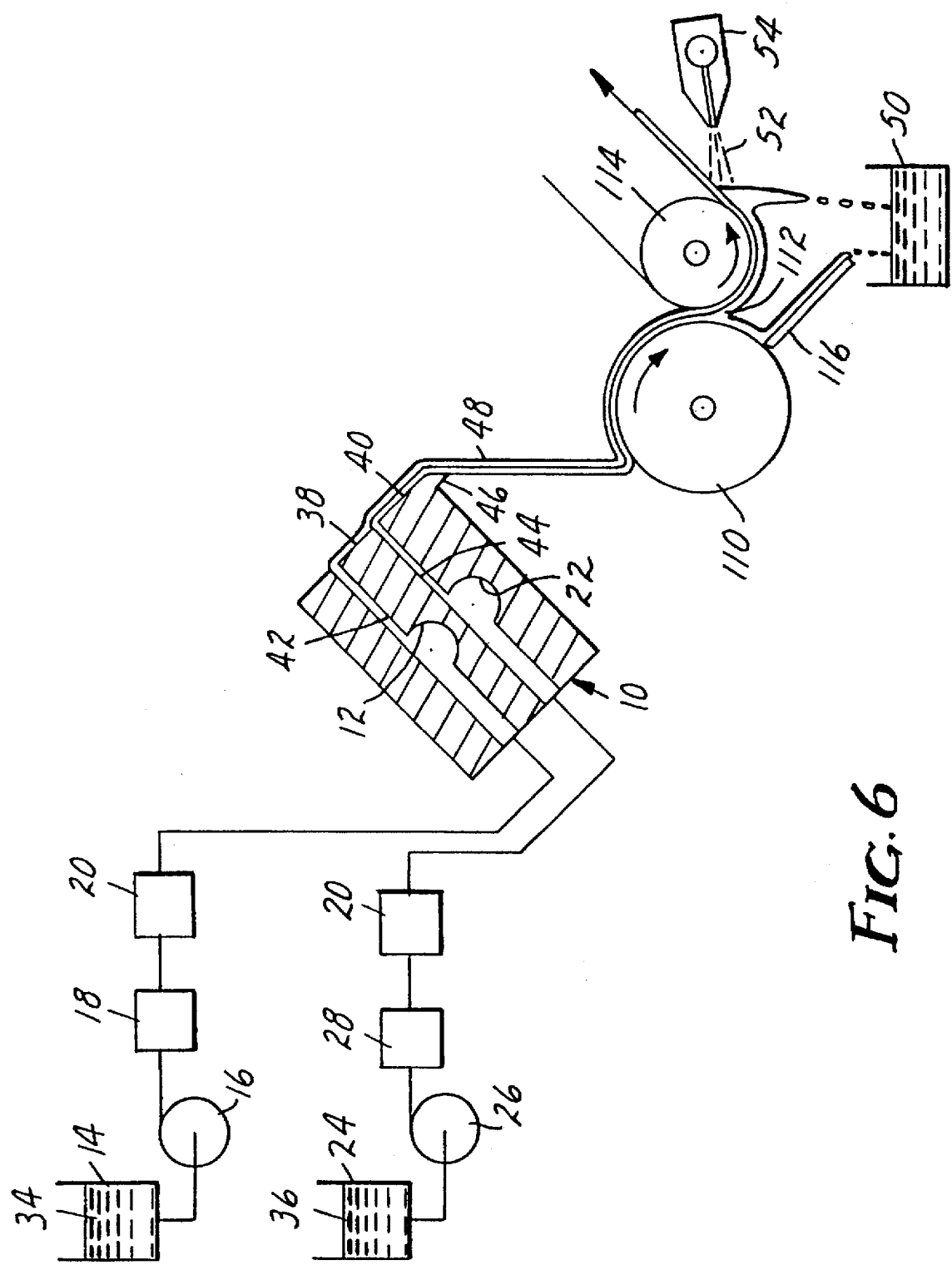
FIG. 6 is a schematic view of another embodiment of the present invention using a transfer roll to carry the carrier and coating fluids to the web.

Another variation of this coating method is shown in FIG. 6. The composite layer is formed on the die 10 and a liquid curtain 48 is formed from the die to a transfer roll 110. A precision gap 112 is maintained between the transfer roll 116 and a web transport roll 114, which rotate in opposite directions. The gap 112 is adjusted so that a second liquid curtain forms in it while allowing all of the composite layer on the transfer roll 110 to pass through the gap 112. The web 32 is also carried through the gap 112 on the surface of the roll 114, and the liquid curtain contacts it so that the coating fluid 34 is interposed between the web surface and the carrier fluid 36. As the composite layer exits from the gap 112, a portion of the carrier fluid may remain on the surface of the transfer roll 110. It is removed from the transfer roll surface by a doctor blade 116 and drains into the receptacle 50. The remaining portion of the carrier fluid 36 stays on the coating fluid wet web surface and is removed by the action of the air doctor nozzle 54 draining by gravity into the receptacle 50.

Figure 7:
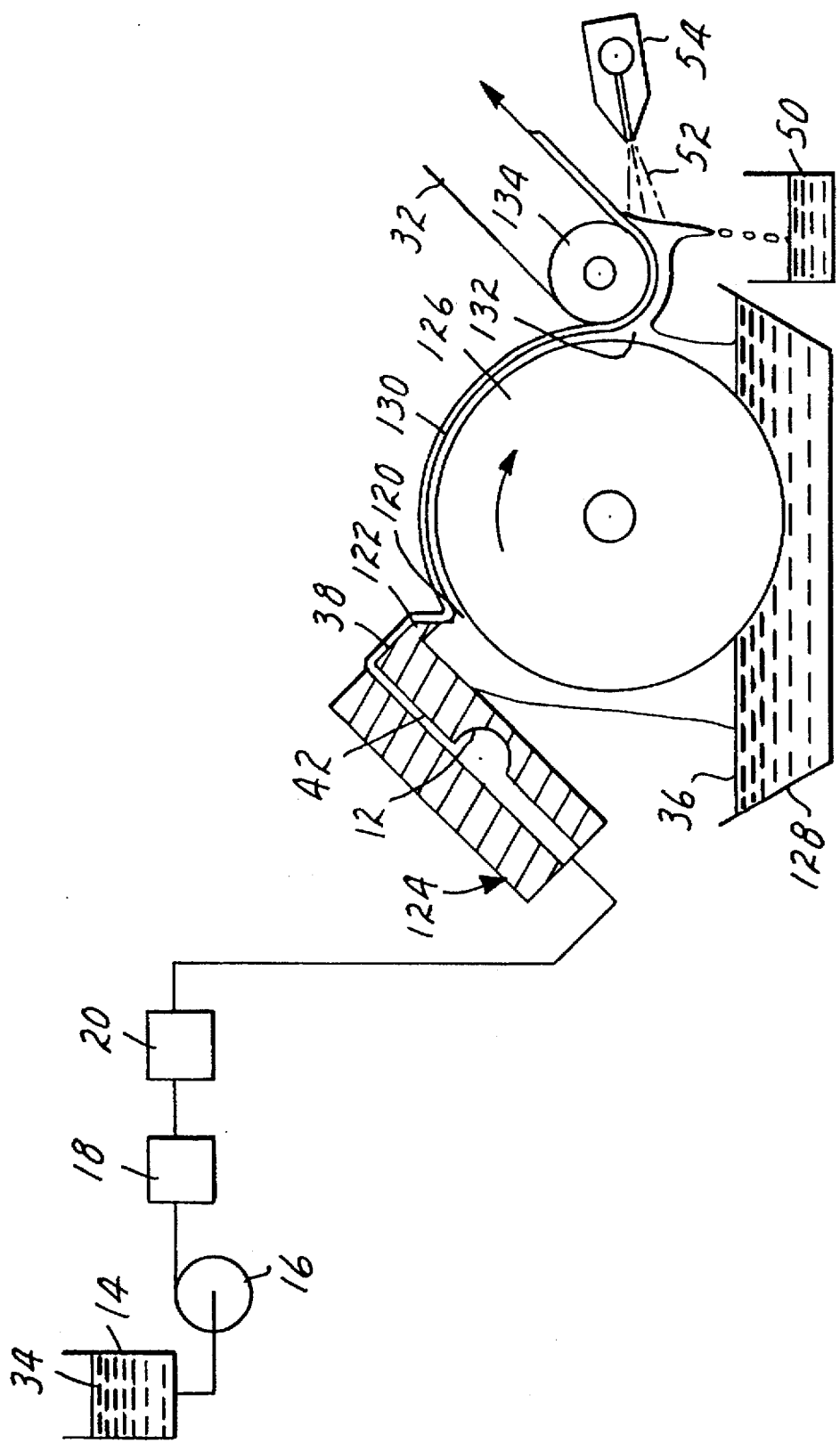
FIG. 7 is a schematic view of another embodiment of the present invention using a knife over roll device combined with a die applicator of the coating fluid.

Another version of the apparatus of FIG. 6 is shown in FIG. 7. The metered layer of carrier fluid 36 is created at a precision orifice 120 between the lip 122 of a die 124 and the surface of a transfer roll 126. The transfer roll 126 rotates through carrier fluid 36, contained by a pan 128, bringing an excess to the gap 120. The coating fluid 34 is pumped to the die cavity 12 and exits from the slot 42 through an orifice onto the die face 38. It flows down the lip 122 and onto the carrier fluid 36 as it exits the gap 120 to form a flowing composite layer 130 on the transfer roll 126. A precision gap 132 is maintained between the transfer roll 126 and the web transport roll 134 which rotate in opposite directions. The gap 132 is adjusted so that a liquid curtain forms in it while allowing all of the composite layer 130 on the transfer roll 126 to pass through the gap 132. The web 32 is also carried through the gap 132 on the surface of the web transport roll 134, and the liquid curtain contacts it so that the coating fluid 34 is interposed between the web surface and the carrier fluid 36. As the composite layer 130 exits from the gap 132, some of the carrier fluid may remain on the surface of the transfer roll 126 and drain back into the pan 128. The remaining carrier fluid stays on the coating fluid wet web surface and is removed by the action of the air doctor nozzle 54 draining by gravity into the receptacle 50.

The coating fluid should have a combination of interfacial properties and viscosity so that it will not de-wet from the web surface after being spread over the surface during transport through the coating station. Examples of coating fluids coatable by this invention are monomers, oligomers, solutions of dissolved solids, solid-fluid dispersions, fluid mixtures, and emulsions. Such fluids are useful in producing a wide range of functional coatings on webs including release coatings, low adhesion coatings, priming layers, adhesive coatings responsive to electromagnetic radiation or electric or magnetic fields, protective coatings, optically active coatings, and chemically active coatings. Coatings made by this invention are expected to have utility in manufacturing products such as pressure-sensitive adhesive tapes, photographic films, magnetic recording tapes, gas separation membranes, reflective sheeting and signing, medical dressings, coated abrasives, printing plates, and films.

This invention differs from surface expansion methods in that surface expansion techniques require an immiscible coating fluid or a fluid containing some insoluble components to spontaneously, rapidly spread over a near stagnant pool of water to create ultra-thin films of coating. The inventor has discovered that the coating fluids, both miscible and immiscible, can flow onto the surface of a moving carrier fluid as an ultra-thin or thin film layer. This enhances the range of fluid coatings that can be coated ultra-thin. Also, in this invention, the entire composite layer forms a flowing liquid bridge and is transferred to the web surface; then the carrier fluid is removed.

This invention makes possible very high coating speeds in excess of 500 meters per minute. Known expansion techniques are limited to less than 50 meters per minute, an order of magnitude less. With expansion techniques, the coating fluid is deposited onto the web directly from the surface of a liquid tank filled with water. This water is a fixed volume, relatively stagnant pool. Contamination of the water with the expansion method is always a risk. With this invention, the continuous flow of carrier fluid helps avoid this problem. Also, with expansion techniques, a solid or near solid film must be formed on the water surface to allow pickup of the coating by the substrate.

This invention differs from known slide and curtain methods as follows. The coating fluid and the carrier fluid flow together to form a stable, flowing composite layer with a free fluid-air surface. This layer can simultaneously be applied to a moving object by forming a fluid bridge to the object made up of a plurality of distinct layers even when the fluids are not miscible. The photographic and graphic arts use simultaneous multiple layer coating techniques but not carrier layers that are removed at the coating station. Additionally, the literature teaches that the fluid solvents in the formulation of these layers should be miscible. Indeed they are normally the same solvent, commonly water.

The literature teaches that the interfacial tension between the layered fluids be very low, preferably zero, and the surface tension of adjacent layers should be only slightly different. With this invention, the interfacial tension between the carrier and the coating is preferred to be as high as possible, and the surface tensions are preferred to differ widely to facilitate carrier removal.

When multiple layer slide or curtain coating is used, the literature teaches that all layers flow in a laminar, streamlined manner to maintain the layered structure and to avoid mixing the layers. With this invention, the fluids can remain unmixed even if the carrier fluid becomes turbulent.

When multiple layer slide, curtain, or slot coating methods are used, the literature teaches that the ratio of thickness of top-to-bottom adjacent fluid layers be no larger than 100 to 1 and no single layer be thinner than 0.1 micron. This invention uses ratios of up to 100,000 to 1 and single layer thicknesses as thin as 0.005 micron. Known slide, curtain, and slot coating methods can not coat a single or multiple layer coating which has a total wet thickness of 5 microns or less. This apparatus can produce single layer coatings of 0.005 to 100 microns.

Figure 8:
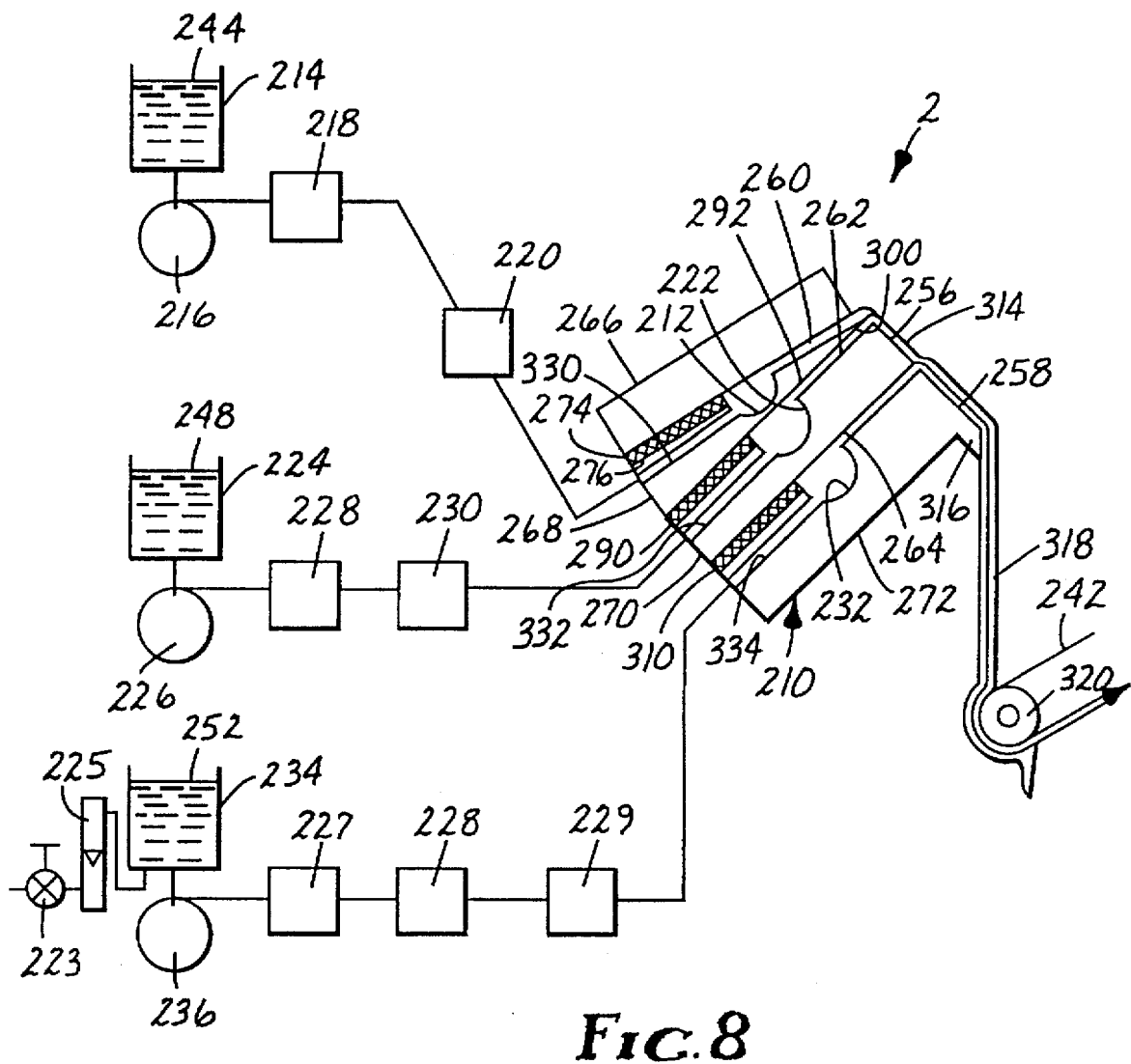
FIG. 8 is a schematic view of another embodiment of the present invention used for coating adjacent stripes.

FIG. 8 shows a coating station having an apparatus for coating thin stripes. A coating die 210, similar to that of FIG. 1, has a first internal cavity 212. The internal cavity 212 is connected to a tank 214 by a precision metering pump 216 through a filter 218 and a bubble trap 220. The die 210 also has a second internal cavity 222. The internal cavity 222 is connected to a tank 224 by a precision metering pump 226 through a filter 228 and a bubble trap 230. The die 220 also has a third internal cavity 232. The internal cavity 232 is connected to a sealed vacuum tank 234 by a precision metering pump 236 through a surge tank 227, a filter 228, and a flowmeter 229. A coating station includes the die 220 and roller 320. A continuous web 242 passes through the coating station and past the die 220 which is mounted transverse to the web.

A first coating fluid 244 is pumped at a precisely controlled rate from the tank 214 by the precision metering pump 216 through the filter 218 and the bubble trap 220 into the internal cavity 212 of the coating die 220 through a feed passageway 330. A second coating fluid 248 is pumped at a precisely controlled rate from the tank 224 by the precision metering pump 226 through the filter 228 and the bubble trap 230 into the internal cavity 222 of the coating die 220 through a feed passageway 332. Carrier fluid 252 is pumped at a controlled rate from the tank 234 by the precision metering pump 236 through the surge tank 227, the filter 238 and the flow meter 229 into the internal cavity 232 of the coating die 220 through a passageway 334. Carrier fluid is continuously added to the vacuum tank 234 through a flow control valve 223 and flow meter 225 from a source (not shown). The tank 234 is connected to a vacuum source which is not shown. For ultra-thin coatings, the flow rate of the carrier fluid is much greater than that of the coating fluid.

The internal cavities 212, 222, 232 distribute the flow of coating fluids 244, 248, and carrier fluid 242 across the width of the die 220 and to the die faces 256, 258 by respective distribution slots 260, 262, 264. The slot 260 is formed between die plates 266 and 268. The slot 262 is formed between die plates 268 and 270, and the slot 264 is formed between die plates 270 and 272.

Figure 9:
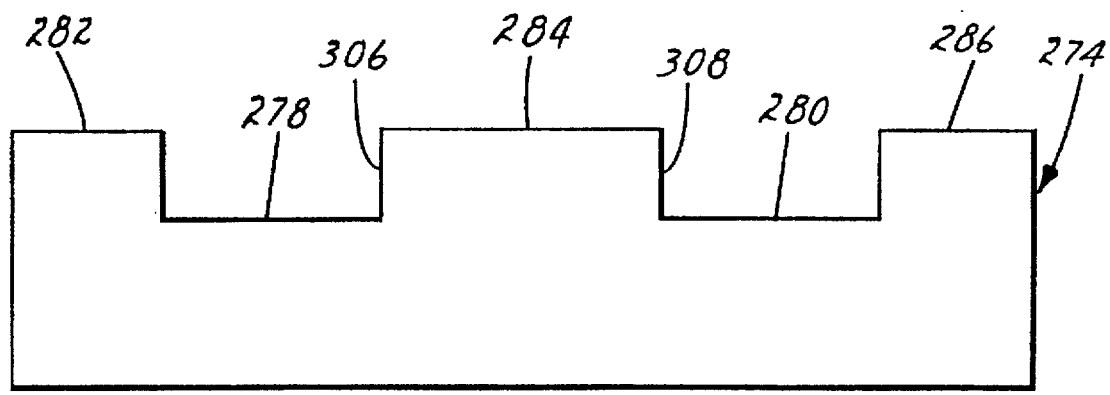
FIG. 9 is a side view of a shim used in the coater of FIG. 8.

The slot 260 gap is set by a shim 274, also shown in FIG. 9. The width of the shim 274 equals the width of the die 220. Its thickness determines the slot 260 gap and normally ranges from 0.0127 cm to 0.127 cm. It is configured so its exterior dimensions match the face 276 dimensions of the die plate 268. Notches 278, 280 are formed in the shim 274 to produce a slot when the shim 274 is sandwiched between the die plates 266, 268. The slot 260 is not continuous across the width of the die but is interrupted by the unnotched portions 282, 284, 286 of the shim. In this manner, the first coating fluid 244 is metered onto the face 288 of the die plate 270 and flows down the face 288 as stripes aligned with the openings in the slot 260 which are created by the notches 278, 280 in the shim 274.

Figure 10:
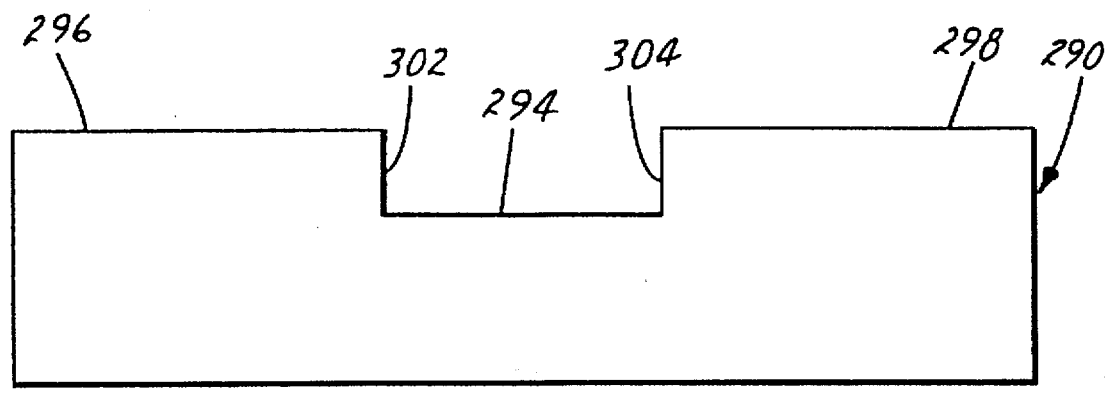
FIG. 10 is a side view of another shim used in the coater of FIG. 8.

The slot 262 gap is set by a shim 290, also shown in FIG. 10. The width of the shim 290 equals the width of the die 220. Its thickness determines the slot 262 gap and normally ranges from 0.0127 cm to 0.127 cm. It is configured so its exterior dimensions match the face 292 dimensions of the die plate 268. A notch 294 is formed in the shim to produce the slot 262 when the shim is sandwiched between the plates 268, 270. The slot 262 is not continuous across the width of the die but is interrupted by the unnotched portions 296, 298 of the shim. In this manner the second coating fluid 248 is metered onto the face 288 of the die plate 270 and flows down the face 288 as a stripe aligned with the opening in the slot 262 which is created by the notch 294 in the shim 290.

Alternatively, the shims 274, 290 can be replaced by notches machined directly into a face of the die plate. Various numbers and combinations of shims and notches can be used to create various stripe patterns.

The die plate 268 is wedged shaped so that the slots 260, 262 merge together at the wedge point 300. The shims 274, 290 are configured to produce a stripe of the second coating fluid 248 abutted to the stripes of first coating fluid 244 on each side of the die face 288. To connect adjacent stripes, the sides 302, 304 of the notch 294 in the shim 290 are aligned with the notch sides 306, 308 of the shim 274. The sides 302, 306 are aligned and the sides 304, 308 are aligned. This physical merging of the slots at their exits and the alignment of their edges produces a single layer of stripes of coating fluids 244 and 248 that join together at their edges and flow down the face 288 as a single flowing layer of abutted stripes.

The carrier fluid slot 264 gap is set by a shim 310. The width of the shim 310 equals the width of the die 220. Its thickness determines the slot 264 gap and normally ranges from 0.0127 cm to 0.127 cm. The carrier fluid 252 flows to the die face 258 at the exit of the slot 264. At this point, the layer 314 of abutting and flowing liquid stripes flows onto the surface of the carrier fluid 252 to form a layered flowing composite of coating fluids 244, 248, and the carrier fluid 252.

The coating fluids 244, 248 flow onto the top of the carrier fluid 252 at the exit of the slot 264, and then flow on top of the carrier fluid 252, in face-to-face contact, down the inclined die face 258 to the die lip 316. From the lip 316, the composite layer film falls in a curtain 318 under the influence of gravity to contact the web 242. The web 242 is moved through the coating station and past the die 220 so that when the multiple layer curtain 318 contacts the web 242 the coating fluid is adjacent the web surface and is interposed between the web and the carrier fluid. The coating fluids 244, 248 contact the web 242. The carrier fluid 252 does not. At the point of contact, a composite layer of coating fluid and carrier fluid has been applied to the web.

The flow rate of the coating fluids 244, 248 are so low that they form ultrathin layers when they flow onto the carrier fluid 252 at the exit of the slot 264. Generally, their thicknesses range from 50 to 20,000 angstroms. After the composite layer is deposited on the web 242, the web passes around a roller 320 and the carrier fluid 252 is removed. If the carrier fluid 252 is water which has a low viscosity and a high surface tension and the coating fluids are organics of moderate to high viscosity and low surface tension, the removal may be accomplished by simple draining at low web speeds.

Figure 11:
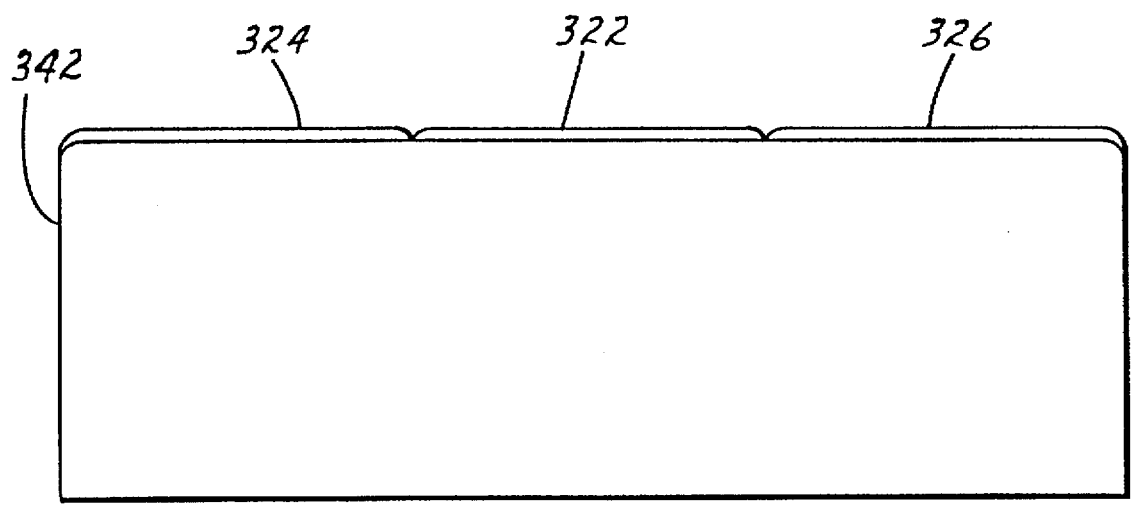
FIG. 11 is a cross-sectional view of a web coated with stripes.

FIG. 11 shows a cross section of the coated web 242 after removal of the carrier fluid 252. The second coating fluid 248 is deposited as the stripe 322 for the length of the substrate. The first coating fluid 244 is deposited as stripes 324, 326 which abut both sides of the stripe 322. The web thickness will commonly be 10 to 10,000 times thicker than that of the applied coating fluids.

Very surprisingly, it is not necessary that the coating fluids have equal viscosities, equal surface tensions, or flow rates that are equal per unit width of the die. If they do not, there is some lateral cross web movement of the mating line between the abutting stripes on the die face 288. However, the inventors discovered that this is generally small and of such a consistent amount that one can compensate for it by adjusting the position of the sides 302, 304, 306, 308 of the shims. Any lateral movement on the face 288 of the mating line results in stripe widths on the coated web that do not equal the corresponding slot widths in the die. All of this lateral movement seems to occur before the coating fluids flow onto the carrier fluid, and no movement has been yet detected on the carrier fluid or after coating on the substrate. This unexpected behavior assists the coating of abutting stripes.

When the adjacent stripes are composed of fluids of different physical and chemical properties some diffusion of adjacent fluids into each other may occur. Because of this, there may be some variation or blending in properties at the mating line. This generally is limited to 0.1 to 5.0 mm in the direction perpendicular to the mating line and in the plane of the substrate surface.

Many different die geometries and mechanical systems may be used to produce a layer of coating side-by-side abutted stripes on a carrier fluid. The coating fluid flowing stripes may be formed simultaneously or sequentially. Die slots from which flowing stripes of coating fluid are formed may abut internally in the die body, at a common exit, or not at all. One or more of the coating fluid flowing stripes may be formed by means other than flow through a slot. The discharge orifices through which the coating fluids flow to form a flowing liquid stripe need not have an open shape which is a quadrilateral. Multiple orifices may be used for the formation of any one flowing stripe. It also may be possible to form the flowing stripes of coating fluid by depositing them drop by drop directly on to the surface of the carrier fluid.

The invention is further illustrated by the following example.

Using the slide curtain coater die shown in FIG. 8, an ultrathin coating of three side-by-side stripes of two different formulations of silicone oligomers, silicone A and silicone B, was produced. The carrier fluid was tap water from the municipal water supply with no added surface modifying agents. The water was vacuum degassed to remove air bubbles. Shims as shown in FIGS. 9 and 10 were used to produce the stripes. The notch in the FIG. 10 shim was 5.08 cm wide while the notches in the FIG. 9 shim were 8.73 cm wide. Both shims were 0.152 mm thick.

Silicone A was an oligomer supplied by the General Electric Corp. designated GE9300 with 3% GE catalyst. Its viscosity was 292 centipoise, and its surface tension was 21 dynes/cm. Silicone B was a proprietary silicone formulation 16MESS with 5% R52522 catalyst. Its viscosity was 1550 centipoise, and its surface tension was 24 dynes/cm.

Silicone A was supplied at a rate of 0.229 $cm^3$/min to the slot formed by shim 290 in die 220. Silicone B was supplied at a rate of 0.796 $cm^3$/min to the slot formed by shim 274 in die 220. Water carrier fluid was supplied to the die at 3000 $cm^3$/min through a die slot 25 cm wide in the direction transverse to the web. The coating slot for the carrier fluid (water) slot gap was 0.76 mm. A web 15.2 cm wide was past by the die at a speed of 25 cm/sec.

A continuous coating of silicone A 4.7 cm wide was produced on the web center in the middle of its width and running continuously down its length. A continuous coating of silicone B was applied on each side of the A stripe extending to from the center A stripe on both sides to the edge of the web. At the coating speeds of 25 and 50 cm/sec coating thicknesses of silicone A on the substrate of 3200, and 1600 Å were obtained respectively. The silicone B coating thicknesses were 3000 and 1500 Å. The mating zone width where the formulations diffused together was judged to be less than 0.2 mm wide. At coating speeds of 25 cm/sec this mating line was not straight but wavered back and forth about 0.5 mm. At 50 cm/sec the mating line was unwavering running straight down the web on both sides of polymer stripe A.

Both formulations were cured with UV light after coating and after the carrier fluid removal. This produced coatings of solid silicone polymers on the web. These formulations produce low adhesion when a pressure sensitive tape is laminated to surfaces coated with them. Furthermore, the value for the adhesion is markedly different for these two formulations. Using this property difference I tested the partitioning of coatings A and B on the coated and cured web. The center stripe of polymer A produced uniform and distinctly lower release values than the stripes of B on either side of it. The release of the B stripes was uniform and even. Nowhere along the mating line of the stripe was there any lack of release indicating complete abutting of the stripes. The change in release value changed abruptly at the mating line.

Many variations of the described systems can be used. For example, the flowing layer of carrier fluid need not be formed flowing from a slot of a die. It can be formed from the flow over a weir or an open trough. Also, the composite layer need not be formed on the die. The coating fluid can be deposited on the carrier fluid after it leaves the die lip. Also, a multiple layer carrier fluid and a multiple layer coating fluid can be used. A multiple layer carrier fluid could have a pure upper layer and a recycled lower layer. Also, these systems need not use a die at all. For example, a fluid trough which terminates in an overflow weir to create a curtain can be used. The coating fluid is placed on the surface of the carrier fluid before a curtain is formed.

We claim:

1. A method of coating a substrate with a layer comprising the steps of:

moving the substrate along a path through a coating station;

forming a plurality of separate flowing stripes of at least first and second coating fluids having different formulations;

flowing the coating fluids into side-by-side abutting contact to form a single flowing layer of side-by-side stripes without functional mixing between adjacent stripes;

forming a composite layer comprising the plurality of coating fluids and at least one carrier fluid having a different formulation from the those of the first and second coating fluids;

flowing the composite layer at a rate that is sufficient to form a continuous flowing fluid bridge of composite layer to the substrate for the coating width, wherein the carrier fluid portion of the composite layer is continuous;

contacting the substrate with the flowing composite layer to interpose the coating layer between the substrate and the carrier fluid; and removing carrier fluid while leaving the coating fluid deposited on the substrate as a coating layer wherein the removing carrier fluid step comprises at least one of mechanical doctoring, draining by gravity, centrifugal removal, blowing, suctioning off, and using magnetic fields.

2. The method of claim 1 wherein the flowing step comprises flowing the composite layer at a rate that is sufficiently high to form a continuous flowing fluid bridge of composite layer to the substrate for the coating width without being sufficiently high to form a continuous flowing fluid bridge of only the coating fluid.

3. The method of claim 1 wherein the coating deposited on the substrate has a thickness that is less than 50 microns.

4. The method of claim 3 wherein the coating deposited on the substrate has a thickness that is less than 5 microns.

5. The method of claim 1 wherein the moving step comprises moving the substrate through the coating station at speeds ranging from 1 to 2000 m/minute.

6. The method of claim 1 wherein the forming a composite layer step comprises continuously metering the respective fluids through respective orifices.

7. The method of claim 6 wherein the forming a plurality of separate flowing stripes of coating fluids step comprises flowing the stripes through respective die cavities which have complementary distribution slot widths that create the corresponding stripes.

8. The method of claim 1 further comprising the step of selecting a carrier fluid that does not wet the coating-covered substrate.

9. The method of claim 1 further comprising the step of selecting a carrier fluid that is not miscible with the coating, that has a lower viscosity than the coating, and that has surface tension greater than the coating.

10. The method of claim 1 further comprising controlling the width of the carrier fluid layer.

11. The method of claim 1 wherein the removing the carrier fluid step comprises removing the carrier fluid without drying the carrier fluid.

12. The method of claim 1 wherein the removing the carrier fluid step comprises removing the carrier fluid after solidifying or gelling of the carrier fluid.

13. A method of coating a substrate with a layer comprising the steps of:

moving the substrate along a path through a coating station;

forming a plurality of separate flowing stripes of at least first and second coating fluids having different formulations;

flowing the coating fluids into side-by-side abutting contact to form a single flowing layer of side-by-side stripes without functional mixing between adjacent stripes;

forming a composite layer comprising the plurality of coating fluids and at least one carrier fluid having a different formulation from the those of the first and second coating fluids;

flowing the composite layer at a rate that is sufficient to form a continuous flowing fluid bridge of composite layer to the substrate for the coating width, wherein the carrier fluid portion of the composite layer is continuous;

depositing the composite layer onto a transfer surface;

contacting the substrate with the flowing composite layer to interpose the coating layer between the substrate and the carrier fluid; and removing carrier fluid while leaving the coating fluid deposited on the substrate as a coating layer.

14. The method of claim 13 further comprising the steps of:

removing the carrier fluid from the transfer surface; and transferring some portion of the coating fluid to the substrate from the transfer surface after both the transfer surface depositing step and the carrier fluid removing step.

15. A method of coating a substrate with a layer comprising the steps of:

moving the substrate along a path through a coating station;

forming a plurality of separate flowing stripes of at least first and second coating fluids having different formulations;

flowing the coating fluids into side-by-side abutting contact to form a single flowing layer of side-by-side stripes without functional mixing between adjacent stripes;

forming a composite layer comprising the plurality of coating fluids and at least one carrier fluid having a different formulation from the those of the first and second coating fluids using carrier fluid that is immiscible with the coating fluids with which it forms an interface and wherein the carrier fluid has wetting properties that cause it to not wet the surface of the first and second coating fluid-coated substrate;

flowing the composite layer at a rate that is sufficient to form a continuous flowing fluid bridge of composite layer to the substrate for the coating width, wherein the carrier fluid portion of the composite layer is continuous;

contacting the substrate with the flowing composite layer to interpose the coating layer between the substrate and the carrier fluid;

depositing on the substrate the plurality of separate flowing stripes of coating fluids at wet calipers ranging from 50 through 10000 angstroms; and removing carrier fluid while leaving the coating fluid deposited on the substrate as a coating layer.

16. A method of coating a substrate with a layer comprising the steps of:

moving the substrate along a path through a coating station;

forming a plurality of separate flowing stripes of at least first and second coating fluids having different formulations;

flowing the coating fluids into side-by-side abutting contact to form a single flowing layer of side-by-side stripes without functional mixing between adjacent stripes;

forming a composite layer comprising the plurality of coating fluids and at least one carrier fluid having a different formulation from the those of the first and second coating fluids using carrier fluid that is immiscible with the coating fluids with which it forms an interface and wherein the carrier fluid has wetting properties that cause it to not wet the surface of the first and second coating fluid-coated substrate;

flowing the composite layer at a rate that is sufficient to form a continuous flowing fluid bridge of composite layer to the substrate for the coating width, wherein the carrier fluid portion of the composite layer is continuous;

contacting the substrate with the flowing composite layer to interpose the coating layer between the substrate and the carrier fluid; and removing carrier fluid while leaving the coating fluid deposited on the substrate as a coating layer.

17. An apparatus for coating a substrate with an ultra-thin layer comprising:

means for bringing together at least first and second separate coating fluids having different formulations, which are in side-by-side abutting contact and which can form a single flowing layer of side-by-side stripes without functional mixing between adjacent stripes;

means for depositing the plurality of coating fluids onto a carrier fluid having a different formulation from the those of the first and second coating fluids to create a plurality of flowing layers of fluid in face-to-face contact with each other to form a composite layer;

means for moving the substrate at a spaced distance from the means for bringing together to permit the composite layer to form a continuous flowing fluid bridge to the substrate for a desired coating width and to deposit the coating layer on the substrate; and means for removing carrier fluid while leaving the coating fluids deposited on the substrate as a coating layer;

wherein the means for bringing together comprises a die having a face, a slot communicating between the cavity and the face, and a lip, wherein the carrier fluid exits from the slot onto the face and flows along the face to the lip, wherein the depositing means deposits the coating fluids onto the carrier fluid while the carrier fluid flows along the face, and wherein the composite layer is transported along the die face to the die lip.

18. The apparatus of claim 17 further comprising a shim located in the carrier fluid die distribution slot which controls the width of the carrier fluid.

19. The apparatus of claim 17 wherein the die further comprises a plurality of cavities and distribution slots for receiving respective coating fluids; and a shim having a thickness and located in at least a first coating fluid die distribution slot, wherein the shim thickness determines a first coating fluid die distribution slot gap.

20. The apparatus of claim 19 wherein the shim comprises at least one notch and at least one unnotched portion, wherein the notch produces a slot when the shim is located in the first coating fluid die distribution slot, and wherein the slot is not continuous across the width of the die and is interrupted by the unnotched portion, wherein the coating fluid flowing through the first coating die distribution slot is metered out of the die and flows as a stripe.

21. The apparatus of claim 20 wherein a shim is located in a second coating fluid die distribution slot and wherein each shim comprises at least one notch and at least one unnotched portion, wherein the notch produces a slot when the shim is located in the second coating fluid die distribution slot, and wherein the slot is not continuous across the width of the die and is interrupted by the unnotched portion, wherein the coating fluid flowing through the second coating fluid distribution slot is metered out of the die and flows as a stripe, and wherein the notch in the shim in the first coating fluid die distribution slot corresponds, in a downweb direction, to the unnotched portion in the shim in the second coating fluid die distribution slot to produce a single layer of abutting side-by-side stripes of the first and second coating fluids.

22. The apparatus of claim 20 wherein the die is formed of several die plates with two adjacent die plates defining an distribution slot, and wherein the die plate between and defining two adjacent coating fluid die distribution slots is wedged shaped to cause the slots to merge together at the point of the wedge.

23. The apparatus of claim 17 wherein at least one coating fluid comprises precursors of functional release coatings.

24. The apparatus of claim 17 further comprising means for depositing on the substrate the separate flowing stripes of coating fluids at wet calipers ranging from 50 through 10000 angstroms.

25. The apparatus of claim 17 wherein the carrier fluid is immiscible with the coating fluids with which it forms an interface and wherein the carrier fluid has wetting properties that cause it to not remain as a continuous film covering the surface of the first and second fluid-coated substrate.

26. The apparatus of claim 25 wherein the means for depositing the plurality of coating fluids onto a carrier fluid to create a plurality of flowing layers of fluid in face-to-face contact with each other to form a composite layer comprises means for preventing the carrier fluid from remaining as a continuous film covering the surface of the first and second fluid-coated substrate after the deposition step and after the doctoring step while the substrate transits through coating station.

27. The apparatus of claim 17 wherein the means for removing the carrier fluid comprises at least one of draining by gravity, absorption by contacting with an absorptive solid material, mechanical doctoring, blowing off, squeegeeing, centrifugal removal, suctioning off, and using magnetic fields.

28. The apparatus of claim 17 wherein the means for removing the carrier fluid comprises removing the carrier fluid without drying the carrier fluid.

29. The apparatus of claim 27 wherein the means for removing the carrier fluid comprises removing the carrier fluid after solidifying or gelling of the carrier fluid.

30. An apparatus for coating a substrate with an ultra-thin layer comprising:

means for bringing together at least first and second separate coating fluids having different formulations, which are in side-by-side abutting contact and which can form a single flowing layer of side-by-side stripes without functional mixing between adjacent stripes;

means for depositing the plurality of coating fluids onto a carrier fluid having a different formulation from the those of the first and second coating fluids to create a plurality of flowing layers of fluid in face-to-face contact with each other to form a composite layer;

means for moving the substrate at a spaced distance from the means for bringing together to permit the composite layer to form a continuous flowing fluid bridge to the substrate for a desired coating width and to deposit the coating layer on the substrate;

means for removing carrier fluid while leaving the coating fluids deposited on the substrate as a coating layer; and a transfer surface on which the composite layer is deposited before being deposited on the substrate.

* * * * *